US005083911A

United States Patent [19]

Hisaeda et al.

[11] Patent Number: 5,083,911

[45] Date of Patent: Jan. 28, 1992

[54] PRESSURE SLIP CASTING APPARATUS FOR PRODUCING SANITARY WARE

[75] Inventors: Masanobu Hisaeda, Kita-Kyushu; Satoru Saitou, Handa; Masahiro Ogata, Kita-Kyushu, all of Japan

[73] Assignee: Toto Ltd., Kita-Kyushu, Japan

[21] Appl. No.: 561,069

[22] Filed: Aug. 1, 1990

[30] Foreign Application Priority Data

Aug. 3, 1989 [JP] Japan .................................. 1-201798

[51] Int. Cl.[5] ........................ B29C 41/16; B29C 45/64

[52] U.S. Cl. ...................................... 425/84; 425/414; 425/577

[58] Field of Search .................... 264/86, 84; 425/414, 425/542, 554, 556, 450.1, 451, 451.9, 84, 85, 577

[56] References Cited

U.S. PATENT DOCUMENTS

| | | | |
|---|---|---|---|
| 3,313,875 | 4/1967 | Magerle | 425/450.1 |
| 3,533,812 | 10/1970 | Cummings et al. | 264/86 |
| 3,852,017 | 12/1974 | Derror | 425/451 |
| 4,524,943 | 6/1985 | Busch et al. | 425/554 |

*Primary Examiner*—Willard E. Hoag

*Attorney, Agent, or Firm*—Fleit, Jacobson, Cohn, Price, Holman & Stern

[57] ABSTRACT

A pressure slip casing apparatus for producing a sanitary ware such as a toilet bowl, comprises lifting hydraulic cylinder means secured to said top member of a stationary frame; a pair of suspending devices supported by a base plate attached to said lifting hydraulic cylinder means; an interlocking mechanism for operatively connecting said suspending devices to each other; and a hydraulic cylinder device for moving a suspending devices towards and away from each other through the action of said interlocking mechanism. A mold part and a core mold part are attached to said base of said stationary frame and to the lower surface of said base plate, respectively. Side mold parts are suspended by said suspending devices so as to be brought and aligned together when said suspending devices are moved towards each other, and said core mold part and said side mold parts in assembled state are adapted to be lowered by said lifting hydraulic cylinder means so that said side mold parts and said core mold parts are sequentially assembled with said bottom mold part and then clamped therewith.

2 Claims, 7 Drawing Sheets

PRESSURE SLIP CASTING APPARATUS FOR PRODUCING SANITARY WARE

FIELD OF THE INVENTION

The present invention relates to an apparatus for forming a sanitary ware, particularly a toilet bowl, by pressure slip casting method.

DESCRIPTION OF RELATED ART

In recent years, pressure slip casting method has been developed which makes use of a porous-resin mold made of a porous resin with continuous pores defining internal draining passages, as a substitute for conventional plaster mold method. According to this method, since the slip can be deposited on the porous resin mold under pressure, the deposition time can be remarkably shortened as compared with the case where the conventional plaster mold is used. In addition, long drying time which is required in the case of a plaster mold for the purpose of dehydration can be eliminated.

In the pressure slip casting method, however, the mold has to have a high strength enough to withstand the high molding pressure. Such high strength or rigidity can be realized by backing up the porous resin with a backup member charged in a steel frame. In such a case, however, the weight of the mold is increased to undesirably hamper the handling of the mold.

EPC Patent Application Laid-Open Publication No. 211653A1 discloses a pressure slip casting apparatus which comprises an upper mold part, a lower mold part and a pair of side mold parts which are connected to respective rums. After molding, rams connected to the upper and lower mold parts are retracted to move upwardly and downwardly the upper mold part and the lower mold part, respectively thereby separating the molded article from the upper and lower mold parts. Subsequently, a truck with a liftable table is introduced into the casting apparatus and the liftable table is lifted to a level at which the table is just going to contact the lower surface of the molded article. Then, the rams connected to both side mold parts are retracted to move the side mold parts away from each other release to the molded article, whereby the molded article is placed on the table.

PROBLEMS TO BE SOLVED BY THE INVENTION

In this known apparatus, it is difficult to synchronize the releasing motions of both side mold parts because these mold parts are connected to and operated by independent rams, thus posing a risk for the molded article to be deformed during releasing. In addition, connection and fixing of each mold part to the associated rum are not easy to conduct because the mold part has a large weight. Thus, the efficiency of the work is impaired and a difficulty is encountered also in attaining alignment between both side mold parts.

Furthermore, the rums connected to both side mold parts are required to have large stroke, because these runs must perform both the mold clamping and releasing actions. This inevitably increases the size of the molding apparatus, despite a demand for a compact construction of the apparatus.

It is also to be noted that a complicated truck with liftable table has to be used for delivering the molded article out of the molding apparatus, resulting in increase of the cost.

Accordingly, an object of the present invention is to provide a pressure slip casting apparatus for producing a sanitary ware, capable of performing efficient pressure casting of slip with a plurality of mold parts made of a porous resin, while attaining a compact construction of the apparatus.

Another object of the invention is to provide a pressure slip casting apparatus for producing a sanitary ware, wherein side mold parts can be separated from each other so as to transfer the molded article to a truck without delay after movement of the truck into the casting apparatus.

To these ends, according to the present invention, there is provided a pressure slip casting apparatus for producing a sanitary ware comprising: a stationary frame including a base, side posts and a top member; a mold having a bottom mold part, a core mold part and a pair of side mold parts each being formed of a porous body with internal passages; lifting hydraulic cylinder means secured to the top member of the stationary frame; a pair of suspending devices supported by a base plate attached to the lifting hydraulic cylinder means; an interlocking mechanism for operatively connecting the suspending devices to each other;and a hydraulic cylinder device for moving the suspending devices towards and away from each other through the action of the interlocking mechanism; the bottom mold part and the core mold part being attached to the base of the stationary frame and to the lower surface of the base plate, respectively, the side mold parts being suspended by the suspending devices so as to be brought and aligned together when the suspending devices are moved towards each other, the core mold part and the side mold parts in assembled state being adapted to be lowered by the lifting hydraulic cylinder means so that the side mold parts and the core mold parts are sequentially assembled with the bottom mold part and then clamped therewith; the apparatus further comprising clamping devices provided on the posts and capable of clamping the side mold parts to each other subsequent to the clamping operation performed by the lifting hydraulic cylinder means.

After casting of the slip, the operation of the clamping devices are terminated and the core mold part is raised apart from the side mold parts by the operation of the lifting hydraulic cylinder means. Subsequently, the suspending devices are raised to lift the side mold parts away from the bottom mold parts so that the molded article is lifted while being retained between the said mold parts. Then, the truck is moved into the casting apparatus and set right below the molded article. Then, the suspending devices are moved away from each other so as to release the side mold parts from the molded article, whereby the side molded article is placed on the truck.

BRIEF DESCRIPTION OF THE DRAWINGS

In the accompaning drawings,

Referring to FIGS. 1 and 2, a pressure slip casting apparatus of the invention for forming a sanitary ware, e.g., toilet bowl, has a a stationary frame 4 including base 1, side posts 2 and a top member 3. Lifting hydraulic cylinder devices 5 are fixed to the tip member 3 of the frame 4 so as to be situated on vertical central plane of the frame 4. Each of the lifting hydraulic cylinder devices 5 has a piston 7 which is provided with a supporting plate 6 fixed to the lower end thereof. Travelling guides 8, 8 are provided on the front and rear ends of the supporting plate 6. Left and right suspending devices 9,9 are provided on both sides of the hydraulic lifting cylinder device 5 and have wheels 10 by means of which these suspending devices travel along the travelling guides 9, 9. Each suspension device 9 has a pair of suspension frames 12 arranged at front and rear sides of the device 9 and connected to each other through a connecting member 11. As will be clearly seen from FIGS. 4 and 5, a hydraulic cylinder device 13 is fixed to the upper side of the supporting plate 6 and has a piston 14 which is connected to the connecting member 11 of one of the suspending devices 9, 9. Extension of the piston 14 causes this suspending device 9 to move along the travelling guides 8. There is provided an interlocking mechanism which is adapted to cause a movement of the other suspending device 9 in a direction different from that of the movement of the first-mentioned suspending device 9. As will be seen from FIG. 1, the interlocking mechanism includes sprocket wheels 15, 15 rotatably mounted on both ends of the travelling guides 8, and chains 16 having one end secured to one of the suspending device 9,9 and the other end secured to the other suspending device, the chains 16 passing around the sprocket wheels 15. Thus, the pair of suspending devices 9, 9 are connected to each other through a pair of chains 16, 16. When the hydraulic cylinder device 13 is operated to retract its piston 14, the suspending device 9 connected to this piston 14 is moved towards the center of the molding apparatus. Consequently, one of the chains 16 moves around the sprocket wheels 15 clockwise as viewed in FIG. 1 so as to cause the other suspending device 9 to move towards the center of the apparatus by the same amount as that of the movement of the first-mentioned suspending device 9. Conversely, when the piston 14 is extended to displace the associated suspending device 9 outward of the apparatus, the other of the chains 16 moves counterclockwise around the sprocket wheels 15, so that the other suspending device 9 also moves outwardly of the apparatus by the same amount.

Figure 1:
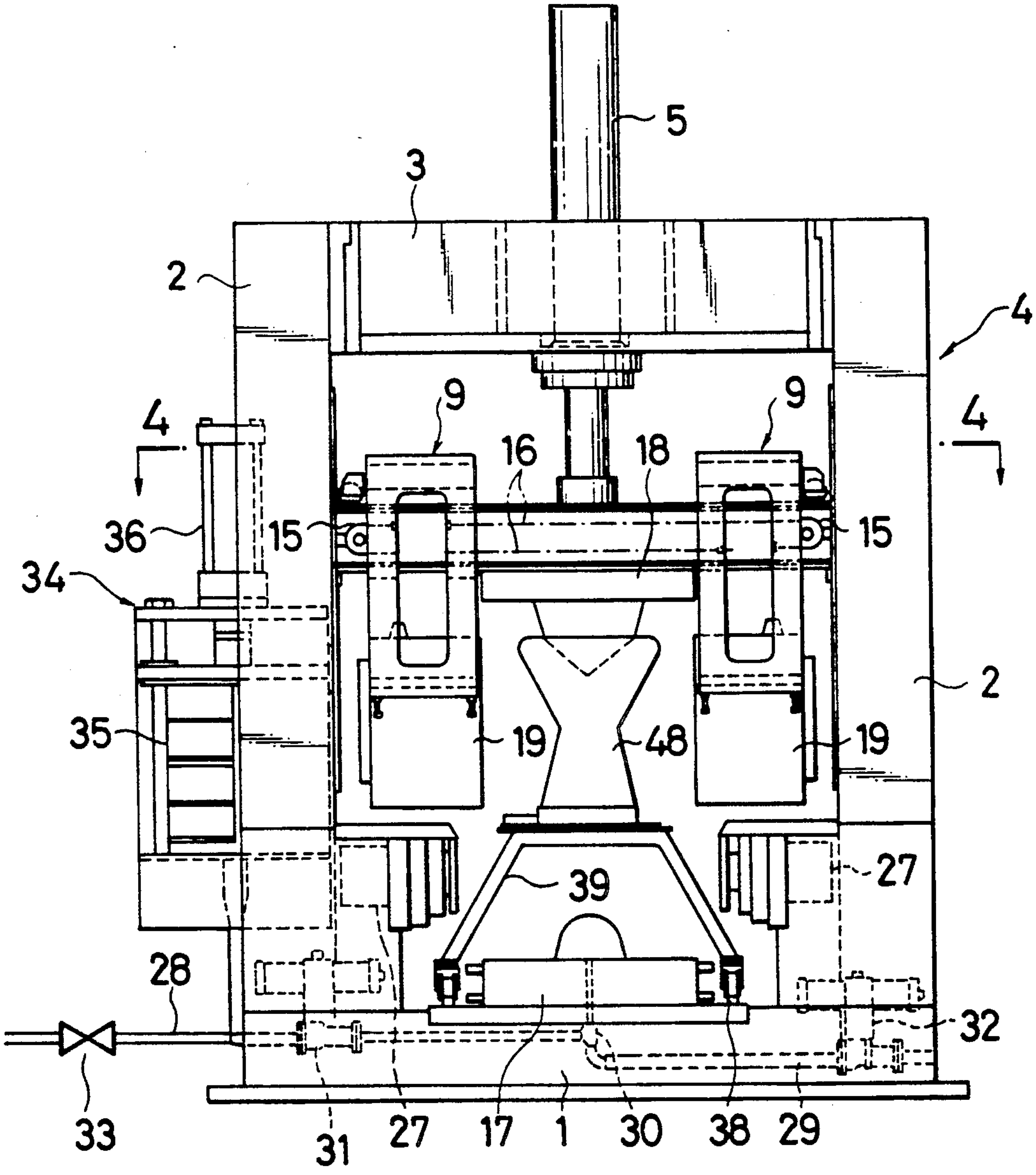
FIG. 1 is a front elevational view of a pressure slip casting apparatus in accordance with the present invention.
Figure 2:
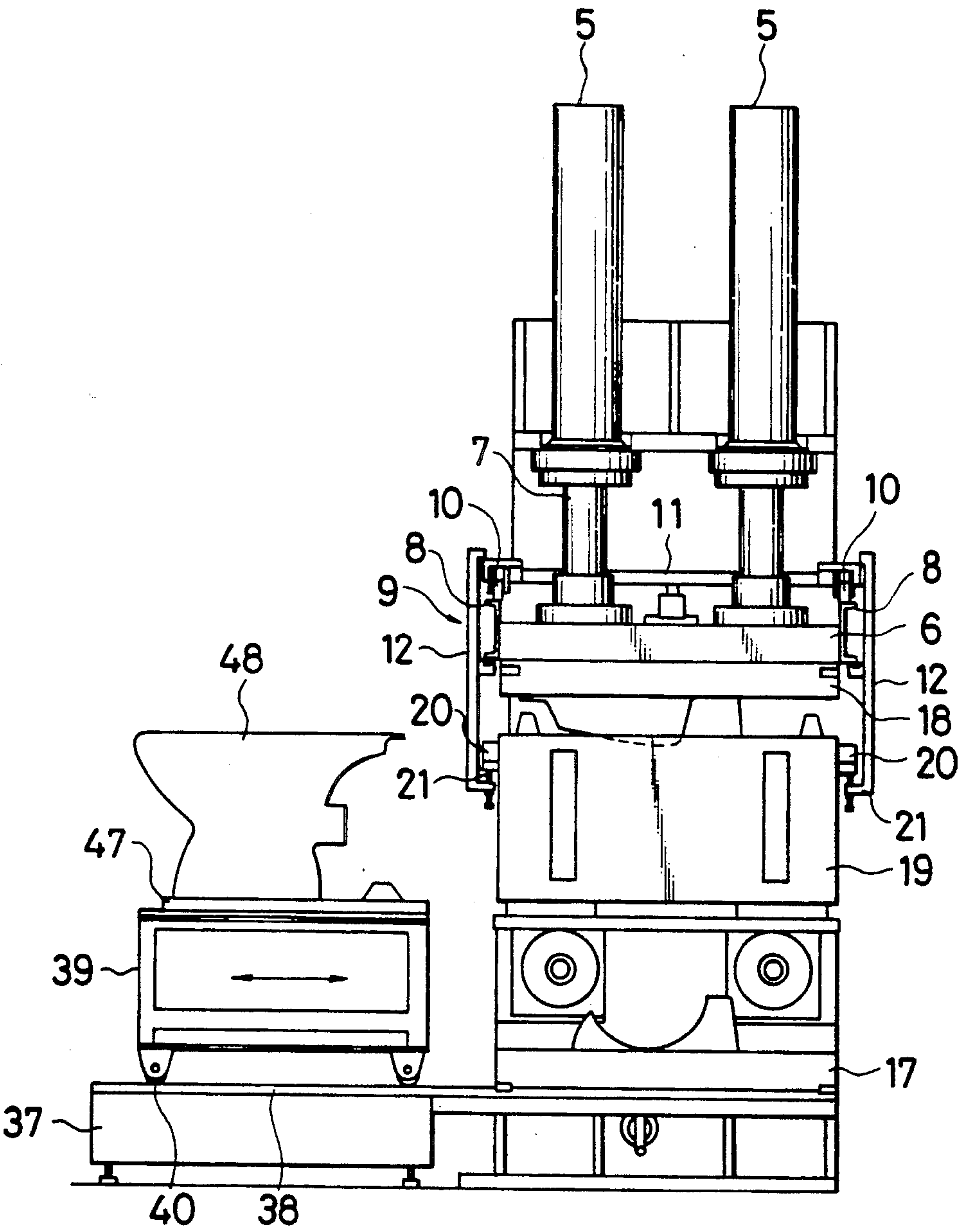
FIG. 2 is a side elevational view of the pressure casting apparatus with a part of a stationary frame of the apparatus being omitted.
Figure 3:
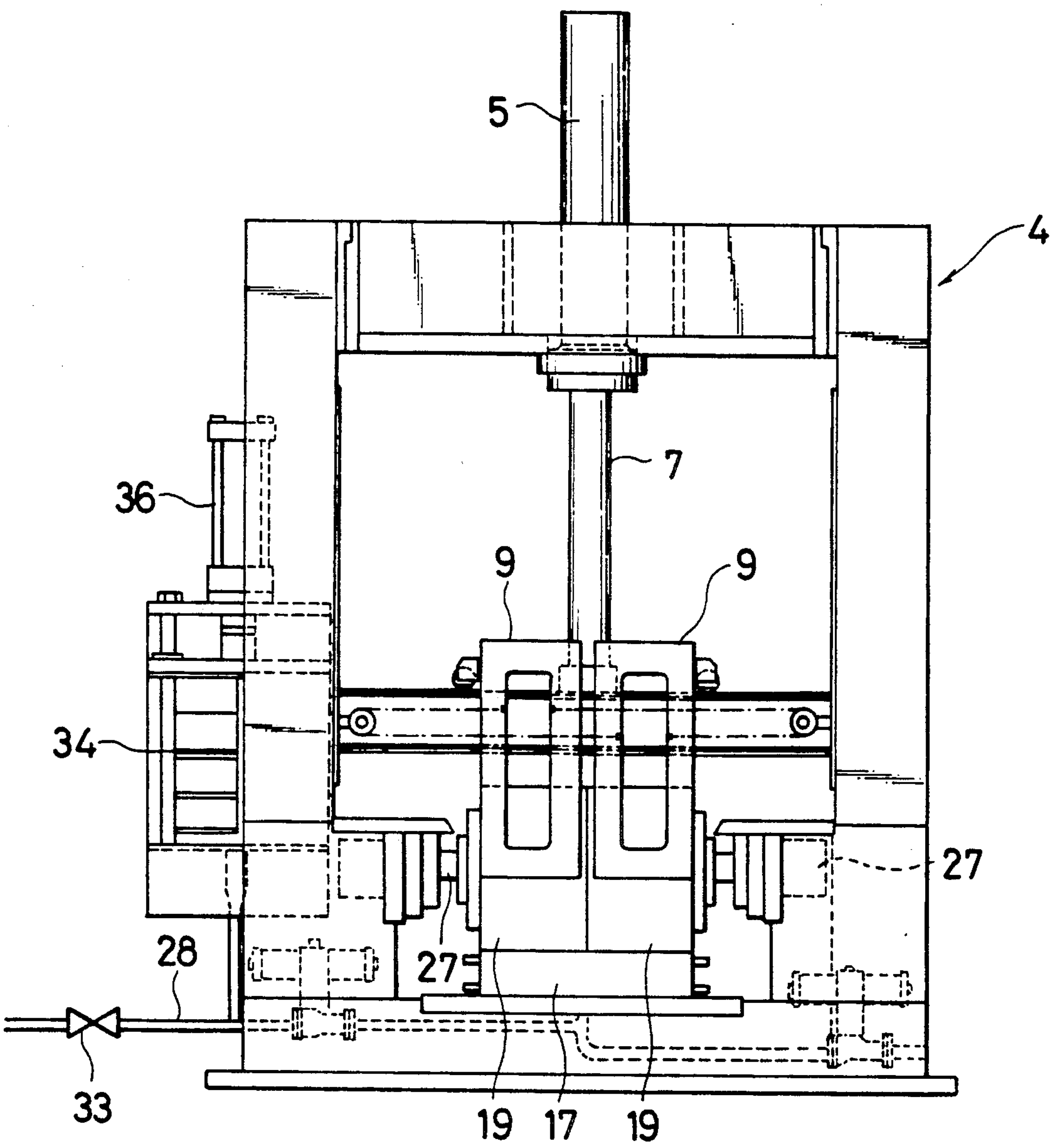
FIG. 3 is a front elevational view of the pressure casting apparatus in a state in which mold parts have been assembled together.
Figure 4:
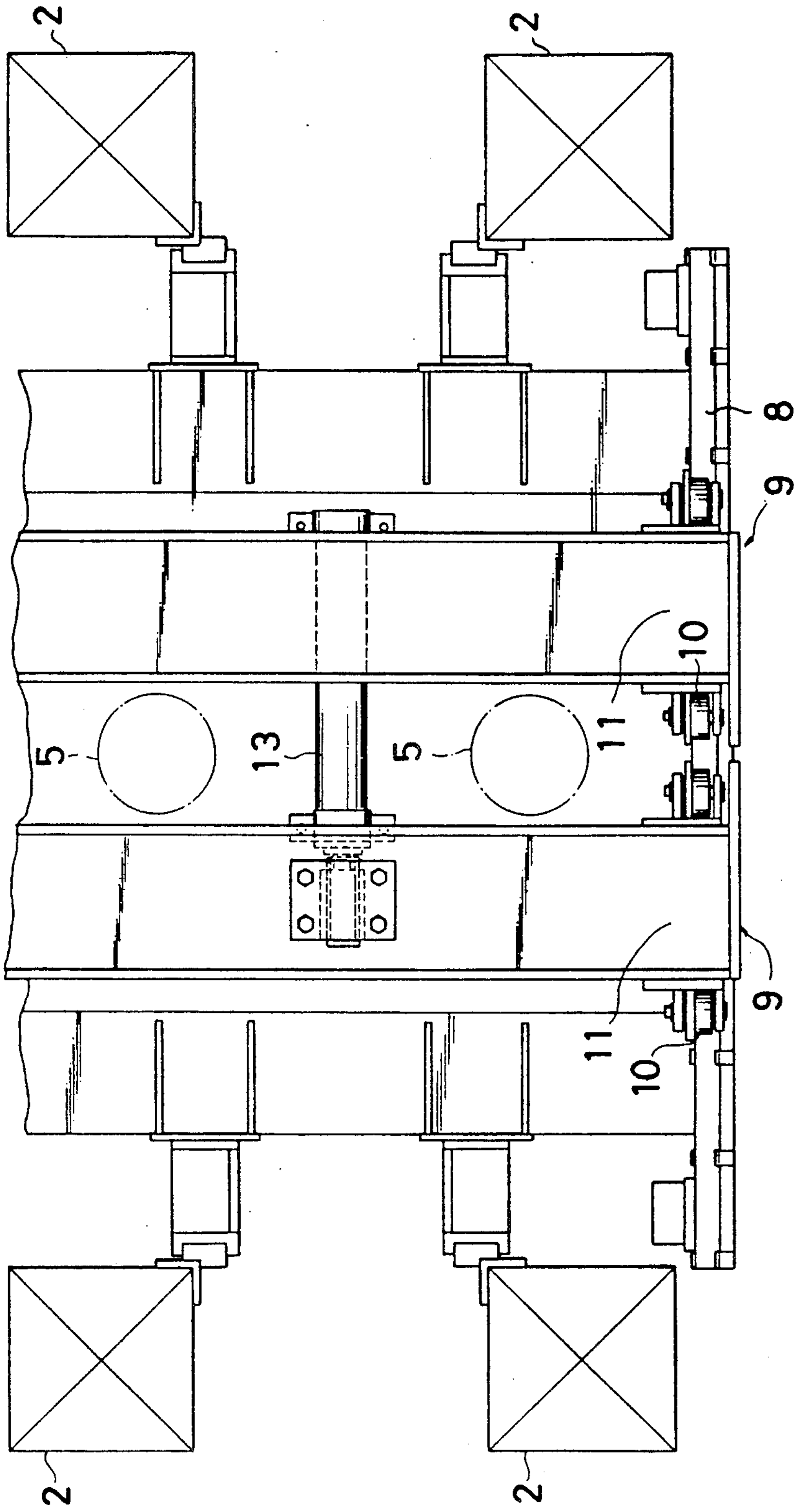
FIG. 4 is an enlarged plan view of a pressure casting apparatus as viewed in the direction of a line 4—4.
Figure 5:
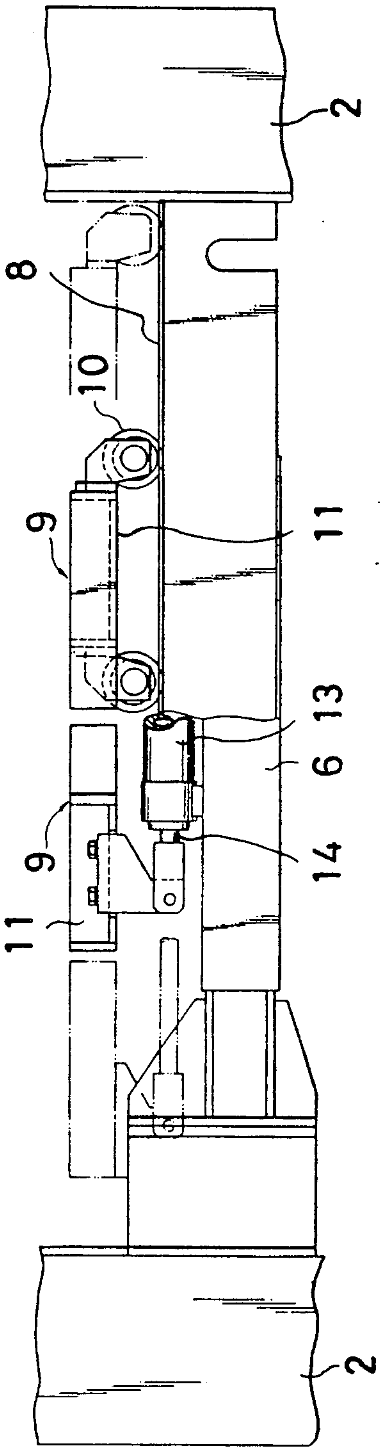
FIG. 5 is a front elevational view of the portion of the pressure casting apparatus shown in FIG. 4.
Figure 6:
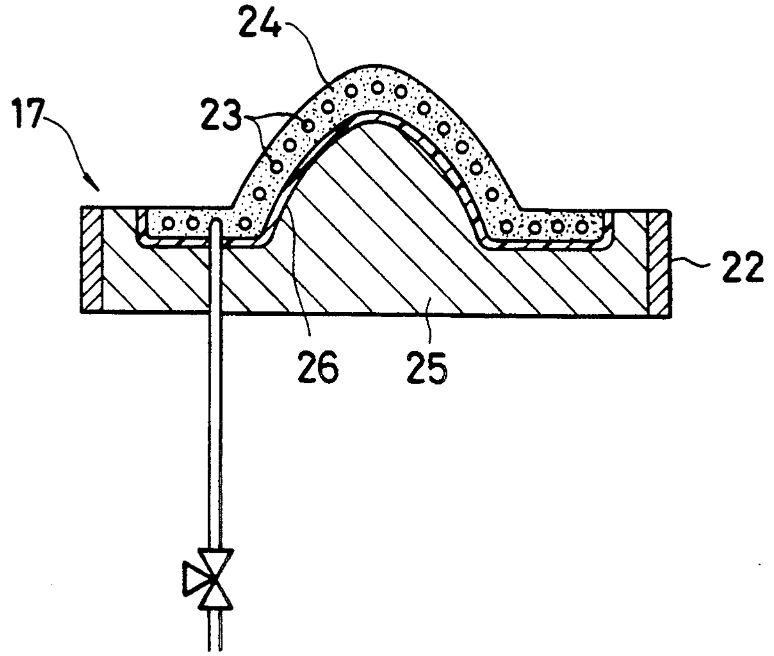
FIG. 6 is a sectional view of a bottom mold part showing the detailed of the construction of this mold part as example of the construction of the mold parts used in the pressure casting apparatus of the invention.

The casting apparatus has a mold which includes of a bottom mold part 17 fixed to the center of the base 1 of the stationary frame 4, a core mold part 18 stationarily fixed to the lower surface of the supporting plate 6, and a pair of side mold parts 19 which are suspended by the respective suspending devices 9, 9 and spaced by predetermined distance from the core mold part 18. The suspension of each side mold part 19 from the associated suspending device 9 is realized by engagement between projections 20 projecting from front and rear ends of the side mold part 19 and hooks 21 provided on the lower ends of the suspending frames 12. The construction of the mold parts will be explained with reference to FIG. 6 showing the bottom mold part 17, by way of reference. The bottom mold part 17 includes a reinforcement steel frame 22, a continuous-pore type porous body 24 having internal hollow passages 23, and a backup member 25 charged in the reinforcement steel frame 22 so as to support the porous body 24. A sealing resin layer 26 is interposed between the porous body 24 and the backup member 25 so as to seal the porous body 24.

Means for clamping the side mold parts 19, 19 includes a pair of hydraulic presses 27 which are provided on the base portion of each post 2 of the stationary frame 4. Obviously, screw-type presses can be substituted for the hydraulic presses.

A slip supply pipe 28 connected to a source (not shown) of slip and a slip discharge pipe 29 are connected to a charging opening 30 formed int he bottom mold part 17. These pipes 28 and 29 are respectively provided with a supply valve 31 and a discharge valve 32. A slip stop valve 33 is provided in the slip supply pipe 28 at a portion thereof upstream of the supply valve 31. A slip pressurizing device 34 is connected to a portion of the slip supply pipe 28 between the valves 31 and 33. In the illustrated embodiment, the slip pressurizing device 34 comprises an expandable pressurizing vessel 35 formed from a rubber bellows and a hydraulic cylinder 36 for expanding and contracting the pressurizing vessel 35. It is of course possible to use other suitable slip pressurizing device.

The casting apparatus is provided with a supporting pedestal 37 adjacent the base 1 of the stationary frame 4. A pair of rails 38 are laid on the base 1 of the stationary frame 4 and the supporting pedestal 37 along both lateral sides of the bottom mold part 17. A truck 39 is so constructed as to straddle over the bottom mold part 17 and has wheels which .travel on the rails 38, 38 so that the truck 39 is movable between the supporting pedestal 37 and the base 1.

Figure 7:
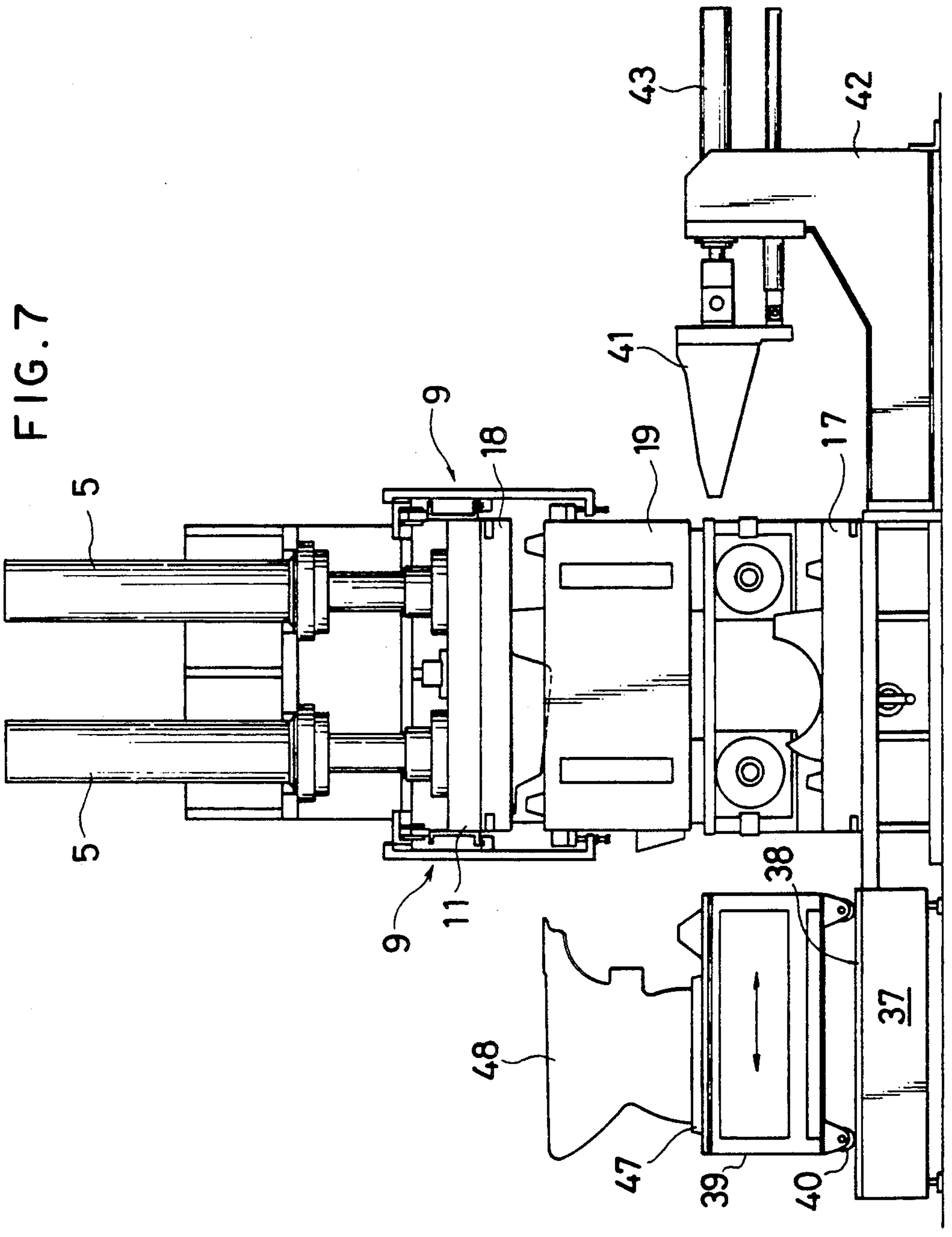
FIG. 7 is a front elevational view of another embodiment of the pressure casting apparatus of the present invention.

FIG. 7 shows another embodiment of the casting apparatus of the present invention. This embodiment is substantially the same as the preceding embodiment in that a plugging mold part 41 is disposed on the end of the apparatus opposite to the supporting pedestal 37. The plugging mold part 41 is secured to the piston of a hydraulic cylinder device 43 mounted on the supporting frame 42, and forms a part of the mold.

It is assumed here that the core mold part 18 and the side mold parts 19, 19 have been raised with respect to the bottom mold part 17 and both side mold parts 19, 19 have been moved away from each other. In this state, as the hydraulic cylinder device 13 is operated to retract its piston 14, both suspending devices 9, 9 are moved along the travelling rails 8,8 towards the center of the apparatus by the operation of the chains 16, 16 so that the side mold parts 19,19 which are suspended from the suspending devices 9, 9, are brought together at the central vertical plane of the apparatus. Subsequently,the lifting hydraulic cylinder means 5 are operated to extend its piston 7 so that the core mold part 18 and the side mold parts 19, 19 are lowered towards the bottom mold part 17. During this downward movement, the side mold parts 19, 19 come to rest on the bottom mold part 17 at positions between the hydraulic presses 27, 27 so as to be assembled together with the bottom mold part 17 and then the core mold part 18 rests on the side mold parts 19, 19 so as to be assembled with these mold parts 19, 19. Then, the hydraulic cylinder means 5 are operated to clamp the core mold part 18, side mold parts 19, 19 and the bottom mold part 17 in the vertical direction. In the case of the embodiment shown in FIG. 7, the plugging mold part 41 is advanced in this state to be fitted to and clamped against the side mold part 19. Thus, the mold is ready for the casting operation.

The stop valve 33 and the supply valve 31 of the slip supply pipe 28, as well as the discharge valve 32 of the slip discharge pipe 29, are opened so that a new batch of slip is supplied from the slip source so that the old slurry stagnant in the slip system are replaced with fresh slip. Them, the discharge valve 32 is closed and the slip is charged into the cavity in the mold through the slip charging opening 30 in the bottom mold part 17 so as to fill the mold cavity with the slip. At the same time, slip is allowed to flow into the pressurizing vessel 35 of the slip pressurizing device 34 communicating with the slip supply pipe 28. Then, the slip pressurizing device 34 is actuated to extend its piston so as to apply a predetermined pressure to the slip in the pressurizing vessel 35 for a predetermined time. As a result of the pressurizing of the slip, the water in the slip is moved into the pores of the porous bodies 24 of the mold and discharged outside the mold through the internal passages 23, whereby a molded article is deposited on the surfaces of the mold cavity presented by the porous bodies 24. The pressure in the internal passages 23 may be positively reduced to promote the movement of the water into the mold parts.

Figure 8:
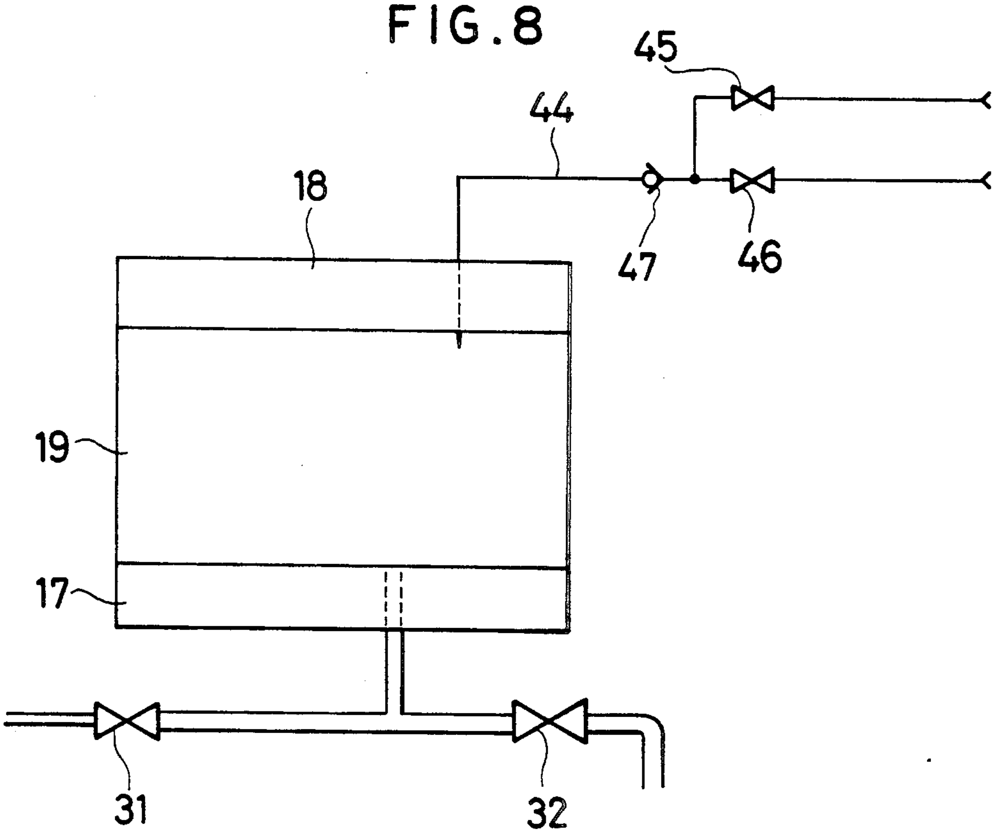
FIG. 8 is a schematic illustration of a mold in assembled state and a compressed air line for blowing compressed air into the mold cavity.

After deposition a desired thickness of the slip on the surfaces of the mold parts defining the mold cavity, the supply valve 31 is closed and the operation of the hydraulic cylinders 5 is stopped. Then, the discharge valve 32 is opened and a air valve 45 is opened so that compressed air is supplied into the mold cavity, whereby surplus slip in the mold is discharged through the slip discharge pipe 29. As shown in FIG. 8, the air valve 45 is provided in an air pipe which is connected to a source of compressed air (not show) and which communicates with the mold cavity. After completion of discharge of the slip, the discharge valve 32 and the air valve 45 are closed and an air valve 46 on the pneumatic air pipe 44 is opened so that pressurized air is supplied into the mold cavity for a predetermined time to promote the migration of the water in the molded article into the porous bodies, until the molded article becomes rigid enough to permit the separation. After elapse of a predetermined time, the air valve 46 is closed and the slip valve 32 is opened to allow the mold cavity to communicate with the atmosphere. A check valve 47 is provided at an intermediate portion of the air pipe 44 to prevent slip from flowing back into the air valves 45, 46.

A description will now be given of the releasing operation for allowing the molded article to be taken out of the mold.

The clamping force is dismissed by relieving hydraulic pressure in the lifting hydraulic cylinder means 5 and the hydraulic presses 27 and also of the hydraulic cylinder 43 for plugging mold part 41 in the embodiment shown in FIG. 7. Then, compressed air is supplied from the exterior through the internal passages 23 into the plugging mold part 41 so that the water in the porous bodies 24 is forced back to the boundary between the molded article and the surfaces of the mold cavity, thus forming a water film along the boundary to facilitate release of the molded article from the mold part. Then, the hydraulic cylinder 43 is retracted to separate the plugging mold part 41. Subsequently,the hydraulic presses 27,27 are completely extracted and compressed air is introduced from the exterior through the internal passages 23 into the core mold part 18 so that the water in the porous body 24 is forced back to the boundary between the molded article and the mold cavity surface, thereby forming a water film along this boundary facilitate release of the molded article from the mold part. The lifting hydraulic cylinder devices 5 are then actuated to lift up the core mold part 18, while raising the lifting devices 9, 9. In this state, however, the side mold parts 19, 19 have not been suspended yet by the suspending devices 9, 9. Namely, the retracting motion of the lifting hydraulic cylinder devices 5 is temporarily stopped at a moment immediately prior to the lifting of the side mold parts 19, 19 by the suspending devices 9, 9, and compressed air is supplied from the exterior through the hollow passages 23 into the bottom mold part 17 so as to force the water in the porous body 24 back to the boundary between the molded article and the surface of the bottom mold part, thus forming a water film thereby facilitating the separation of the molded article from the bottom mold part.

Then, the retracting operation of the lifting hydraulic cylinder devices 5 is commenced again to raise the suspending devices 9, 9 so that the side mold parts 19,19 with the molded article depositing to their surfaces are suspended by the suspending devices 9, 9 so as to be moved upward apart from the bottom mold part 17 thus separating the molded article from the bottom mold part 17. After the lifting hydraulic cylinder devices have operated to its upper stroke end so as to completely suspend the side mold parts 19, 19, the truck 39 carrying a support plate 47 is moved into the molding apparatus. Then, the lifting hydraulic cylinder device 5 operates again to extend so as to lower the side mold parts 19, 19 until the bottom surface of the molded article still clamped between the side mold parts 19,19 gets just going to contact the supporting plate 47, e.g., to a level at which the bottom surface of the molded article is about 1 to 2 mm above the surface of the supporting plate 47. Then, compressed air is supplied from the exterior through the internal passages 23 into the side mold parts 19, 19 so that the water in the porous bodies 24 is moved to the boundaries between both side mold parts and the molded article so as to form water films in these boundaries, thus facilitating the separation. Then,as the hydraulic cylinder device 13 is extended, the suspending devices 9, 9 are moved away from each other by the action of the chains 16, 16 and both side mold parts 19, 19 are moved apart to release the molded article so as to allow the molded article 48 to rest on the supporting plate 47. Finally, the truck 39 is driven out of the molding apparatus onto the supporting pedestal 37, thus completing the take-up of the molded article 48.

Advantages of the Invention

According to the invention, aligning and releasing of the side mold parts is effected by a single exclusive hydraulic cylinder device mounted on a support plate carried by lifting hydraulic cylinder means, while the clamping of the side mold parts is conducted by exclusive stationary clamping devices. Thus, the stroke of the clamping devices can be reduced to enable the apparatus to have a compact design. Furthermore, since the side mold parts are suspended from a supporting plate through suspending devices which are movable laterally towards and away from each other, replacement of the mold parts and adjustment of the mold, parts for alignment are facilitated. Furthermore, since the assembling and separation of the core mold part and the bottom mold part can be effected only by the lifting hydraulic cylinder devices, the molding assembling and releasing operations are simplified to shorten the time required for the releasing of the mold. The bottom mold part is fixed to the base of the stationary frame while the core mold part and the side mold parts in assembled state are moved up and down between the clamping devices by the operation of the lifting hydraulic cylinder devices, and the truck is moved into and out of the molding apparatus while the core mold part and the side mold parts are in the raised positions. With this arrangement, it is possible to simplify the construction of the whole apparatus, thus contributing to the reduction of the size of the whole apparatus. Furthermore, since both side mold parts are brought into alignment with each other and moved apart from each other by the operation of a single hydraulic cylinder device through the action of the interlocking mechanism, both side mold parts are moved strictly at the same speed in synchronization with each other, whereby the assembly of the side mold parts and separation of these mold parts from the molded article can be conducted smoothly.

We claim:

1. A pressure slip casting apparatus for producing a sanitary ware comprising: a stationary frame including a base, side posts and a top member; a mold having a bottom mold part, a core mold part and a pair of side mold parts; means to introduce a slip under pressure into said mold; each of said mold parts being formed of a porous body with internal passages for removing liquid from the slip in the mold; lifting hydraulic cylinder means secured to said top member of said stationary frame; a pair of suspending devices supported by a base plate attached to said lifting hydraulic cylinder means; an interlocking mechanism for operatively connecting said suspending devices to each other; and a hydraulic cylinder device for moving said suspending devices towards and away form each other through the action of said interlocking mechanism; said bottom mold part and said core mold part being attached to said base of said stationary frame and to the lower surface of said base plate, respectively, said side mold parts being suspended by said suspending devices so as to be brought and aligned together when said suspending devices are moved towards each other, said lifting hydraulic cylinder means for lowering said core mold part and said side mold parts in assembled state for sequentially assembling said side mold parts and said core mold parts with said bottom mold part and then clamping therewith; said apparatus further comprising clamping devices provided on said posts and capable of clamping said side mold parts to each other subsequent to the clamping operation preformed by said lifting hydraulic cylinder means.

2. A pressure slip casting apparatus according to claim 1, further comprising a plugging mold part and a device for aligning said plugging mold part and clamping the same to said side mold parts and said core mold part after said side mold parts and said core mold parts have been clamped to said bottom mold part.

* * * * *